United States Patent
Hayasaka et al.

(10) Patent No.: US 10,649,691 B2
(45) Date of Patent: May 12, 2020

(54) STORAGE SYSTEM

(71) Applicant: HITACHI, LTD., Tokyo (JP)

(72) Inventors: Mitsuo Hayasaka, Tokyo (JP); Ken Nomura, Tokyo (JP); Keiichi Matsuzawa, Tokyo (JP); Hitoshi Kamei, Tokyo (JP)

(73) Assignee: HITACHI, LTD., Tokyo (JP)

( * ) Notice: Subject to any disclaimer, the term of this patent is extended or adjusted under 35 U.S.C. 154(b) by 162 days.

(21) Appl. No.: 15/122,310

(22) PCT Filed: Mar. 27, 2014

(86) PCT No.: PCT/JP2014/058878
§ 371 (c)(1),
(2) Date: Aug. 29, 2016

(87) PCT Pub. No.: WO2015/145667
PCT Pub. Date: Oct. 1, 2015

(65) Prior Publication Data
US 2016/0371035 A1    Dec. 22, 2016

(51) Int. Cl.
*G06F 3/06* (2006.01)
*G06F 12/0871* (2016.01)
*G06F 12/0804* (2016.01)

(52) U.S. Cl.
CPC ............ *G06F 3/0659* (2013.01); *G06F 3/064* (2013.01); *G06F 3/0608* (2013.01); *G06F 3/0611* (2013.01); *G06F 3/0673* (2013.01); *G06F 3/0676* (2013.01); *G06F 12/0804* (2013.01); *G06F 12/0871* (2013.01); *G06F 2212/1016* (2013.01); *G06F 2212/312* (2013.01)

(58) Field of Classification Search
None
See application file for complete search history.

(56) References Cited

U.S. PATENT DOCUMENTS

| 5,819,290 A | 10/1998 | Fujita |
| 8,359,430 B1 | 1/2013 | Fair |
| 2002/0129200 A1 | 9/2002 | Arakawa et al. |
| 2003/0200393 A1* | 10/2003 | Cornaby ............ G06F 12/0862 711/118 |

(Continued)

FOREIGN PATENT DOCUMENTS

| JP | 08-339318 A | 12/1996 |
| JP | 2001-188658 A | 7/2001 |

(Continued)

*Primary Examiner* — Charles Rones
*Assistant Examiner* — Ryan Dare
(74) *Attorney, Agent, or Firm* — Volpe and Koenig, P.C.

(57) ABSTRACT

An example of storage system obtains a reference request of a reference request data block that is included in the content and is stored in the medium area. The storage system determines a number of gaps among addresses, in the medium area, of a plurality of data blocks continuous in the content including the reference request data block. The storage system determines, based on the number of gaps, whether or not defrag based on the plurality of data blocks is valid. The storage system writes, when the defrag is determined to be valid, the plurality of data blocks read from the medium area to the memory area, into continuous address areas of the medium area.

11 Claims, 14 Drawing Sheets

(56) References Cited

U.S. PATENT DOCUMENTS

| | | | | |
|---|---|---|---|---|
| 2007/0168633 A1* | 7/2007 | English | ............... | H04L 67/1097 |
| | | | | 711/165 |
| 2010/0312983 A1* | 12/2010 | Moon | ..................... | G06F 3/061 |
| | | | | 711/170 |
| 2012/0117322 A1* | 5/2012 | Satran | ................... | G06F 3/0625 |
| | | | | 711/114 |

FOREIGN PATENT DOCUMENTS

| JP | 2002-268924 A | 9/2002 |
|---|---|---|
| JP | 2005-165781 A | 6/2005 |
| JP | 2008-305313 A | 12/2008 |

* cited by examiner

| REFERENCE REQUEST TIME DEFRAG DETERMINATION TABLE 220 |||
|---|---|---|
| OCCUPATION RANGE OF K BLOCKS IN CONTENT 222 | NUMBER OF GAPS OF K BLOCKS 223 | DEFRAG EXECUTION DETERMINATION RESULT 224 |
| WHOLE CONTENT | 0 | INVALID |
| | 1 | VALID |
| | 2 | VALID |
| | 3 OR MORE | VALID |
| PART OF CONTENT INCLUDING HEAD DATA OF CONTENT | 0 | INVALID |
| | 1 | VALID |
| | 2 | VALID |
| | 3 OR MORE | VALID |
| PART OF CONTENT INCLUDING TAIL END DATA OF CONTENT | 0 | INVALID |
| | 1 | VALID |
| | 2 | VALID |
| | 3 OR MORE | VALID |
| PART OF CONTENT INCLUDING ONLY INTERMEDIATE DATA | 0 | INVALID |
| | 1 | INVALID |
| | 2 | INVALID |
| | 3 OR MORE | VALID |

*Fig. 3*

| UPDATE REQUEST TIME DEFRAG DETERMINATION TABLE 230 | | |
|---|---|---|
| TYPE OF HOST UPDATE REQUEST 232 | CONTINUOUS BLOCK ALLOCATION POSSIBILITY 233 | DETERMINATION RESULT 234 |
| OVERWRITE | — | DEFRAG IS NECESSARY |
| ADD | NOT POSSIBLE | DEFRAG IS NECESSARY |
| | POSSIBLE | DEFRAG IS UNNECESSARY |
| DELETE | — | DEFRAG IS UNNECESSARY |

Fig. 4

STORAGE SYSTEM

BACKGROUND

This invention relates to defragmentation (defrag) in a storage system. As background art of this technical field, there is known U.S. Pat. No. 8,359,430 B1. A storage apparatus disclosed in U.S. Pat. No. 8,359,430 B1 carries out normal reference processing in response to a reference request from a host, and obtains continuous data (logically continuous data) in a content. At this time, when physical locations of the data are not continuous, the storage apparatus writes the data into physically continuous areas during next writing into a disk. Further, in U.S. Pat. No. 8,359,430 B1, there is disclosed a method involving first reading, at the time of a host update request, not only write data thereof but also logically continuous data on the periphery of the offset of the write data, and then wiring the read data in a disk.

SUMMARY

In the storage apparatus disclosed in U.S. Pat. No. 8,359,430 B1, at the time of the host reference request, the data is written into a new area of the disk when the number of read data blocks is small. This causes an increase of randomness of the whole content, resulting in the deterioration of reading performance from the disk. Further, in the storage apparatus disclosed in U.S. Pat. No. 8,359,430 B1, at the time of the host reference request, peripheral data is always written from the disk, and thus host request response performance deteriorates due to input/output (I/O) waiting for the reading. Therefore, there is a demand for achieving a high speed of defragmentation processing while suppressing reduction in processing performance of a host I/O request.

An embodiment of this invention is a storage system including a medium area provided by at least one storage device to store data of a content, and a controller comprising a memory area for temporarily storing data of the medium area. The controller is configured to obtain a reference request of a reference request data block that is included in the content and is stored in the medium area. The controller is configured to determine a number of gaps among addresses, in the medium area, of a plurality of data blocks continuous in the content including the reference request data block. The controller is configured to determine, based on the number of gaps, whether or not defrag based on the plurality of data blocks is valid. The controller is configured to write, when the defrag is determined to be valid, the plurality of data blocks read from the medium area to the memory area, into continuous address areas of the medium area.

According to one embodiment of this invention, the high speed of defrag processing can be achieved while suppressing reduction in processing performance of the host I/O request.

BRIEF DESCRIPTION OF THE DRAWINGS

FIG. 3 illustrates a configuration example of a reference request time defrag determination table;
FIG. 4 illustrates a configuration example of an update request time defrag determination table.

DETAILED DESCRIPTION OF THE EMBODIMENTS

Figure 1:
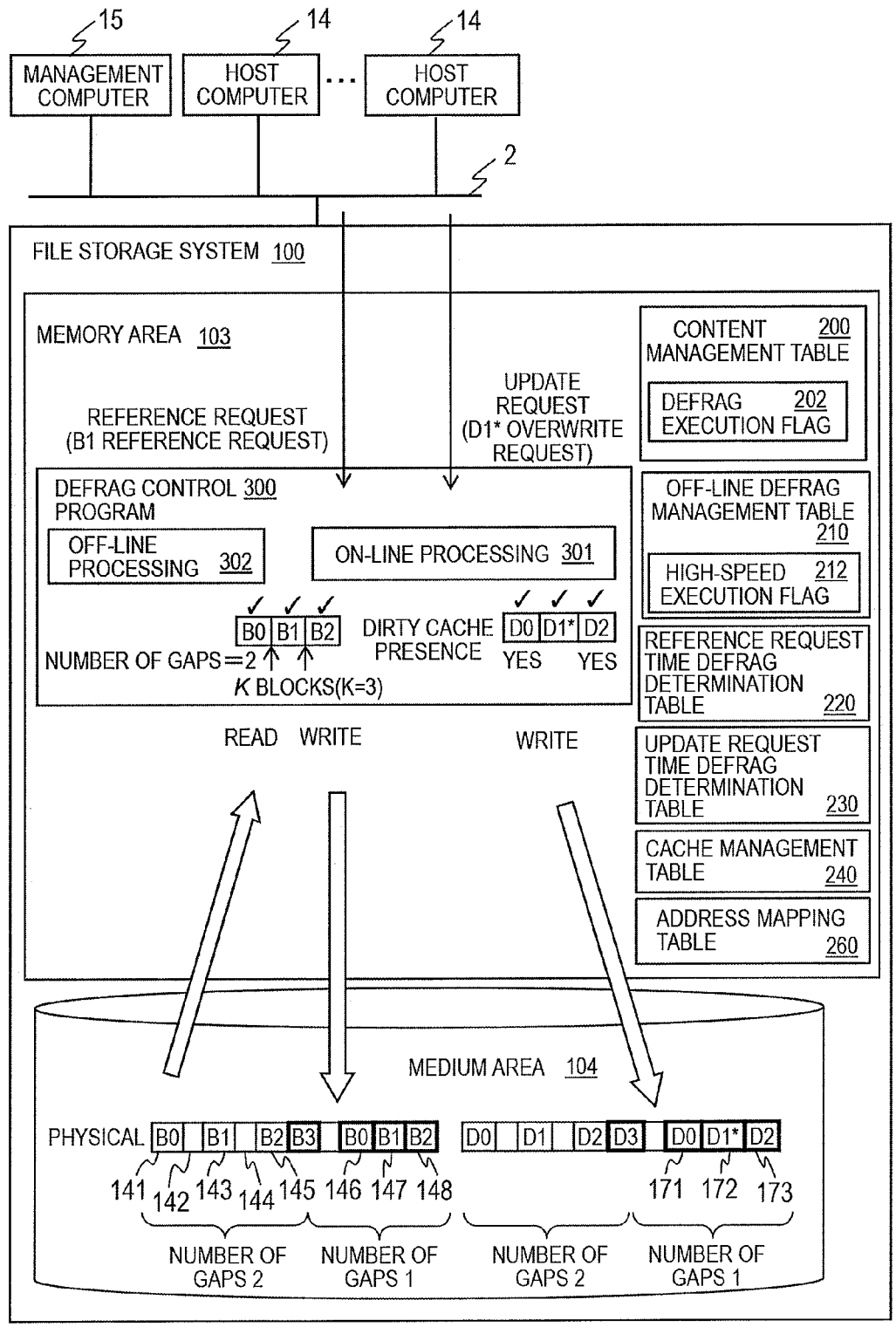
FIG. 1 illustrates an outline of a first embodiment.

Now, some embodiments are described referring to the drawings. It should be noted that the embodiments described below are in no way limitative of the invention as defined in the appended claims, nor elements or combinations thereof described in the embodiments are all essential to solution means of the invention.

In the description below, various types of information are represented by the expression "XX table". However, the various types of information may be represented by data structures other than the table format. In order to indicate independence from the data structure, the "XX table" can also be referred to as "XX information".

In the following description, processing may be described with the use of a program as a subject. However, predetermined processing is appropriately carried out by executing the program by hardware itself or a processor (e.g., microprocessor (MP)) included in the hardware through use of at least one of storage resources (e.g., memory) or a communication interface device (e.g., port). Accordingly, the subject of the processing may be the hardware. A program source may be, for example, a program distribution server or a storage medium.

In the following, a defrag technology in a file storage system is disclosed. The file storage system includes at least one storage device. A storage area provided by at least one storage device is hereinafter referred to as a medium area.

I/O performance of the medium area in the file storage system is limited by a random or sequential access pattern to stored data. For the access to the medium area, an address defined in the medium area is used. The address defined in the medium area is, for example, a logical block address (LBA).

The performance of the random access is lower than that of the sequential access. Thus, in the case of a sequential access request, arranging data so as to prevent a random access as much as possible is advantageous for improving the I/O performance of the storage system.

The file storage system manages data for each content that is a logical unit of data. The contents include, in addition to a normal file, a file aggregating normal files such as an archived file, a backup file, or a volume file of a virtual computer. The content may be a part of the file.

Similarly, a data access occurs for each content. Accordingly, pieces of data forming a content are required to be stored in continuous address areas in the medium area. However, due to a data update request (overwriting, addition, or deletion), stored addresses of the data of the content in the medium area become random, resulting in the deterioration of the I/O performance.

As countermeasures, defrag may be applied. However, in the defrag, all the contents need to be read (random access) from the medium area, and the data thereof needs to be written into new address areas of the medium area. This is a heavy burden, and system performance is reduced.

The file storage system described below executes on-line defrag. The on-line defrag is defrag in processing of at least one of a reference request (host reference request) or an update request (host update request) from a host.

As an example, the file storage system determines, at the time of the host reference request, whether or not defrag based on reference-requested data and data continuous to the reference-requested data in the content is valid. The file storage system determines whether or not defrag is valid based on the number of gaps that the continuous data in the content including the reference-requested data has in the medium area.

A data location in the content is indicated by an offset. The data location in the content may be herein referred to as a logical location. Similarly, data having continuous offsets in the content may be referred to as logically continuous data. On the other hand, data stored in continuous addresses in the medium area may be referred to as physically continuous data. As described above, the address in the medium area is indicated by, for example, the LBA.

The continuous data in the content is divided into a plurality of data blocks to be stored in the medium area. The file storage system determines whether or not the defrag is valid based on the number of gaps between the addresses in the plurality of data blocks (block areas). When the addresses are discontinuous, a gap is present between the addresses. A data storage unit area in the medium area is hereinafter simply referred to as a block.

When the file storage system determines that the defrag is valid, the file storage system writes the plurality of data blocks into continuous address areas (areas including continuous blocks) in the medium area. Through the omission of defrag that is determined unnecessary based on the number of gaps, an increase of loads due to defrag is reduced.

As an example, the file storage system executes on-line defrag at the time of the host reference request only for a content designated in advance. The file storage system determines, at the time of the host update request to the content, whether or not defrag of the content is necessary. The content whose defrag is determined necessary is provided with a flag indicating the necessity.

The file storage system determines, at the time of the host reference request, based on the flag, whether or not on-line defrag is necessary for a target content. Only when the flag indicates that the on-line defrag is necessary, the file storage system executes the on-line defrag. Thus, unnecessary defrag can be further omitted.

As an example, the file storage system executes on-line defrag at the time of the host update request. When data update-requested from the host and data continuous in the content are cached, the file storage system collectively writes the continuous data including the update-requested data into the continuous address areas of the medium area.

As an example, the file storage system executes off-line defrag in addition to the on-line defrag. The off-line defrag is defrag asynchronous with a host request. In the off-line defrag, the file storage system selects a content for which defrag is yet to be completed in the on-line defrag, and applies defrag thereto. The on-line defrag reduces random data arrangement of contents. Therefore, a processing load of the off-line defrag can be reduced, and reduction of system I/O performance can be suppressed.

First Embodiment

FIG. 1 schematically illustrates an outline of processing of a computer system and a file storage system according to a first embodiment. The computer system includes a file storage system 100, a plurality of host computers 14, and a management computer 15. Those are coupled to one another by a network 2.

The host computer 14 is a computer configured to access resources of the file storage system 100 to carry out an operation. The network 2 is a network for communicating user data between the host computer 14 and the file storage system 100 and management data between the management computer 15 and another apparatus. The network 2 is, for example, an Internet Protocol (IP) network.

In FIG. 1, a file system is configured in the file storage system 100. The file storage system 100 includes the file system, and receives access to its held file from the host computer 14.

A memory area 103 of the file storage system 100 stores a defrag control program 300. The defrag control program 300 includes an on-line defrag processing module 301 and an off-line defrag processing module 302.

The on-line defrag processing module 301 refers, when receiving a reference request from the host computer 14, to a content management table 200 corresponding to a reference destination content of the reference request to check whether or not a defrag execution flag 202 is set valid. The content management table 200 stores management information for one content.

When the defrag execution flag 202 is set valid, the on-line defrag processing module 301 executes on-line defrag. This enables prevention of unnecessary on-line defrag processing. Specifically, the on-line defrag processing module 301 reads, from a medium area 104, in addition to reference request data, data (logically continuous data) continuous to the reference request data in the content. The number K of data blocks read from the medium area 104 is an integer of 2 or more. K is a fixed or variable value.

In the example illustrated in FIG. 1, reference data is data B1 in a content B, and the number K of data blocks read from the medium area 104 is 3. The content B includes data blocks B0, B1, B2, and B3. In the content B, the data blocks B0, B1, B2, and B3 are continuously arranged in this order. In other words, the offsets of the data blocks B0, B1, B2, and B3 are continuous. The medium area 104 stores data of the content B, and a data block of the latest data is illustrated as a thick-line block.

In response to a reference request to the data B1, data of blocks 141, 143, and 145 are read from the medium area 104. The blocks 141, 143, and 145 respectively store the data blocks B0, B1, and B2. A method of selecting logically continuous data in the content depends on a design. For example, the on-line defrag processing module 301 may select only data before the reference data, only data after the reference data, or both data before and after the reference data.

The on-line defrag processing module 301 counts the number of gaps among addresses (physical data arrangement) in the medium area 104 of data blocks from which data has been read. In the example illustrated in FIG. 1, the on-line defrag processing module 301 can identify, by referring to an address mapping table 260 associating the offset in the content with the address in the medium area, the address in the medium area 104 from the offset in the content. The on-line defrag processing module 301 refers to a reference request time defrag determination table 220 to determine whether or not defrag is valid for the counted number.

When the on-line defrag processing module 301 determines that the defrag is valid, the on-line defrag processing module 301 writes data into the continuous address areas (physically continuous blocks) of the medium area 104. Accordingly, logically continuous data is formed of physically continuous data blocks.

In the example illustrated in FIG. 1, the number of gaps among the blocks 141, 143, and 145 (data blocks B0, B1, and B2) is 2. There are gaps 142 and 143 respectively between the blocks 141 and 143 and between the blocks 143 and 145.

In this example, the reference request time defrag determination table 220 indicates that the defrag is valid. The on-line defrag processing module 301 writes the data B0, B1, and B3 into the continuous blocks 146 and 147 in the medium area 104. The number of gaps of the content B is reduced from 2 to 1.

Counting of the number of gaps and the determination as to whether or not the defrag is valid may be carried out before the data is read from the medium area 104. When the on-line defrag processing module 301 determines that the defrag is invalid, the on-line defrag processing module 301 may read only the reference data from the medium area 104 without reading any other continuous peripheral data.

Next, on-line defrag to be carried out in response to an update request from the host computer 14 is described. When receiving the update request, the on-line defrag processing module 301 writes, when data logically continuous to the update data is cached, both the update data and the cached data into physically continuous areas.

In the example illustrated in FIG. 1, the host update request indicates overwriting of a content D with update data D1*. The content D is formed of data blocks D0, D1, D2, and D3. In the content D, the data blocks D0, D1, D2, and D3 are continuously arranged in this order. The host update request instructs overwriting of the data block D0 with the data block D1*. Data of the content D is stored in the medium area 104, and a data block of the latest data is illustrated as a thick-line block.

When receiving the host update request with the data block D1*, the on-line defrag processing module 301 refers to a cache management table 240 to determine whether or not data logically continuous to the data block D1* is cached. In the example illustrated in FIG. 1, the data blocks D0 and D2 logically continuous to the data block D1* are cached. The off-line defrag processing module 302 writes the data blocks D0, D1*, and D2 into continuous blocks 171 to 173 of the medium area 104. The number of gaps of the content D is reduced from 2 to 1.

The on-line defrag processing module 301 further determines whether or not the updated content D has been fragmented to necessitate defrag based on an update request time defrag determination table 230. When it is determined that the defrag is necessary, the off-line defrag processing module 302 sets the defrag execution flag 202 to be valid in the content management table 200 of the content D.

Next, off-line defrag is described. The off-line defrag processing module 302 refers to an off-line defrag management table 210 to investigate whether or not a high-speed execution flag 212 is set valid. When the off-line defrag processing module 302 determines that the high-speed execution flag 212 is not set valid, the off-line defrag processing module 302 carries out off-line defrag for all the contents in the medium area 104.

When off-line defrag processing module 302 determines that the high-speed execution flag 212 is set, the off-line defrag processing module 302 selects a content having the defrag execution flag 202 set in the content management table 200, and carries out off-line defrag only for the selected content.

With this configuration, the physical arrangement of the data read in the on-line defrag processing is continuously rewritten. Therefore, reading performance can be improved. Moreover, in the on-line defrag, the amount of data whose physical arrangement becomes continuous increases, and thus, loads of the off-line defrag processing are reduced.

Through the determination as to whether or not to execute on-line defrag based on the number of gaps among the data blocks, on-line defrag processing providing small or no defrag effect is omitted, and thus the influence of the on-line defrag processing on processing performance of the host I/O request can be reduced.

Figure 2A:
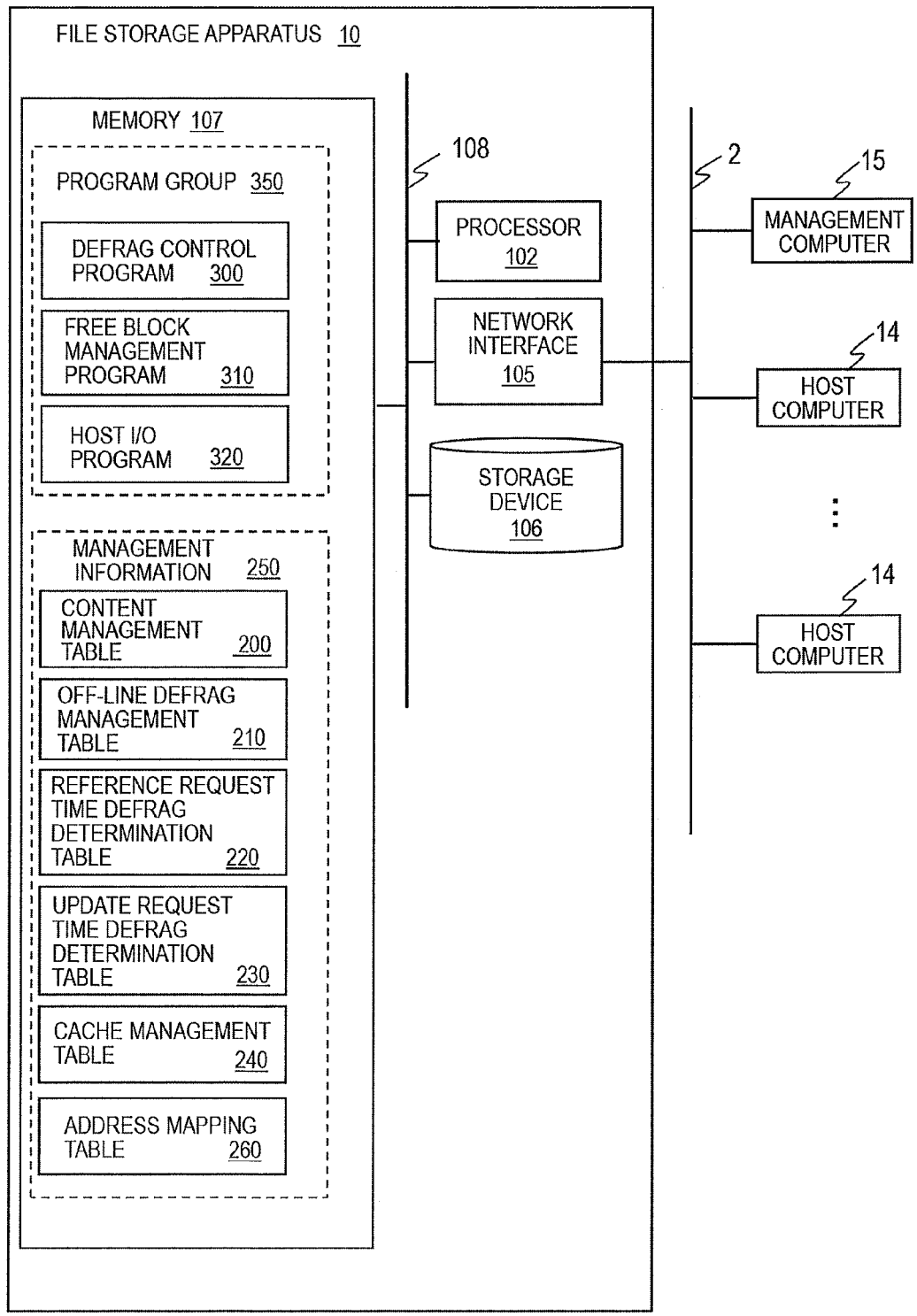
FIG. 2A illustrates a configuration example of a file storage system.

FIG. 2A illustrates a configuration example of a file storage apparatus 10 according to this embodiment. The file storage system 100 includes the file storage apparatus 10. The file storage apparatus 10 is coupled to the management computer 15 and the plurality of host computers 14 via the network 2. The network 2 may be, for example, a wide area network (WAN), a local area network (LAN), the Internet, a public line, or a dedicated line.

The file storage apparatus 10 includes a processor 102, a memory 107, a storage device 106, and a network interface 105. Those are coupled to one another via a system bus.

The processor 102 operates, in accordance with a program stored in the memory 107, by using information stored in the memory area 103, thereby operating as various function modules of the file storage apparatus 10. For example, the processor 102 operates as a defrag control module or a free block management module.

The memory 107 stores a program group 350 and management information 250. The program group 350 includes a defrag control program 300 and a free block management program 310. The management information 250 contains information used by the program group 350. The management information 250 contains the content management table 200, the off-line defrag management table 210, the reference request time defrag determination table 220, the update request time defrag determination table 230, the cache management table 240, and the address mapping table 260.

Further, the memory 107 is used as, in addition to a memory for storing information for operating the file storage apparatus 10, a cache memory for temporarily storing user data of the host computer 14, and a work memory for the processor 102. The memory 107 provides the memory area 103 illustrated in FIG. 1. As the memory 107, a volatile semiconductor memory such as a dynamic random access memory (DRAM) or a nonvolatile semiconductor memory such as a flash memory is used, and data access thereto can be made faster than to the medium area 104.

For convenience of description, the program group 350 and the management information 250 are illustrated in the memory area 103. Typically, the program group 350 and the management information 250 are loaded from the storage device 106.

In this example, the storage device 106 stores, in addition to a program necessary for achieving a predetermined function, management information, and metadata, the user data of the host computer 14. The storage device 106 provides the medium area 104. For example, the storage device 106 is a storage device including a non-transitory, nonvolatile storage medium, and may be coupled via a network.

The defrag control program 300 includes, as described above, the on-line defrag processing module 301 for executing the defrag at the time of the host I/O request and the off-line defrag processing module 302 for executing the defrag asynchronously with the host I/O request.

The free block management program 310 manages use/nonuse of a block that is a data storage unit of the medium area 104 (storage device 106) for storing the user data. The free block management program 310 stores free block management information indicating an address of a free block in the medium area, and updates the management information in response to a data update in the medium area 104.

The defrag control program 300 determines, in cooperation with the free block management program 310, a write destination of the physically continuous areas for content data read from the medium area. The free block management program 310 manages, after application of the defrag, a block storing the content data as a free block.

Figure 2B:
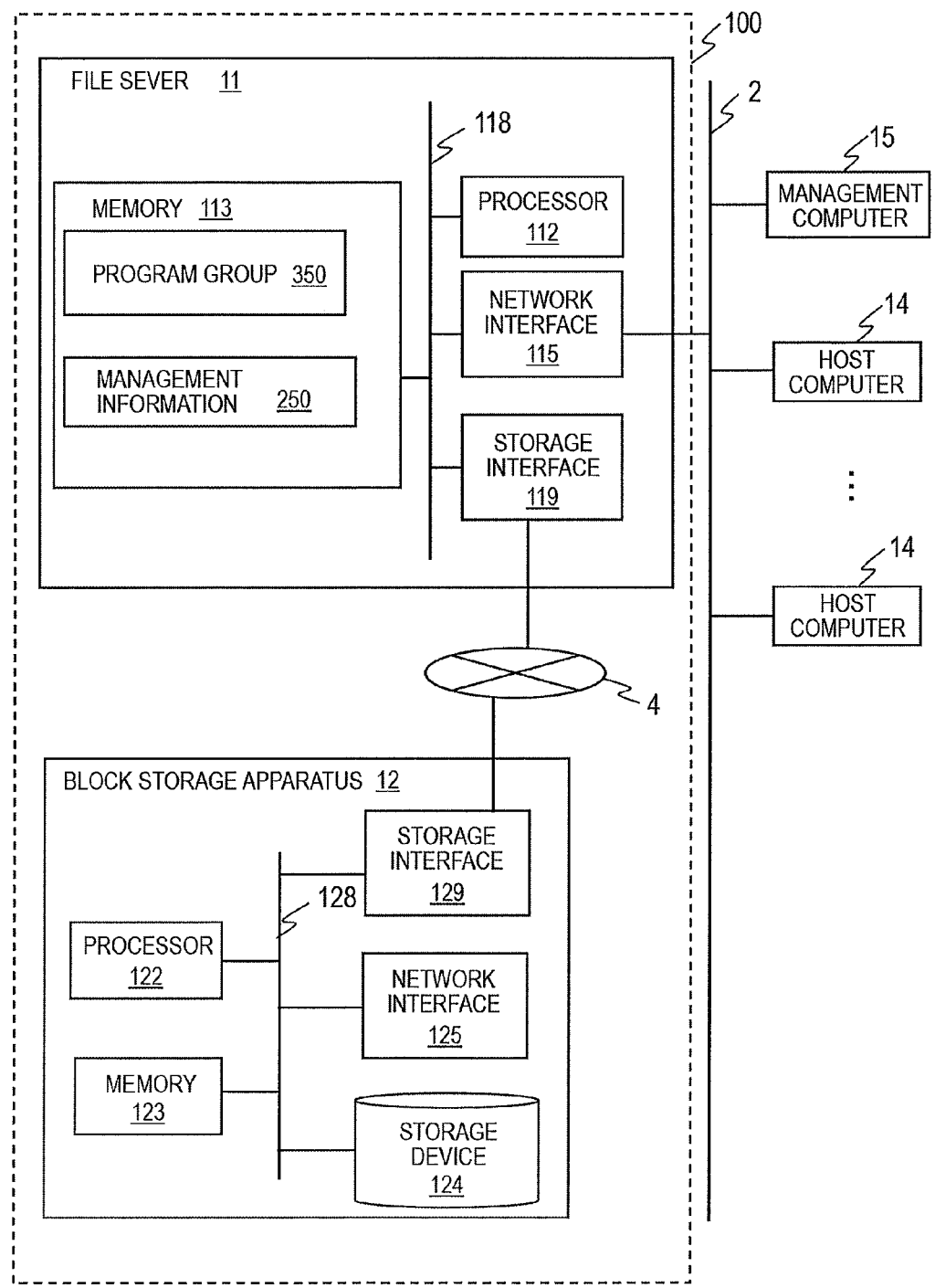
FIG. 2B illustrates another configuration example of a file storage system.

FIG. 2B illustrates another configuration example of the file storage system 100. In this example, the file storage system 100 includes a file server 11 and a block storage apparatus 12. The components other than the storage device 106 in the configuration illustrated in FIG. 2A are included in the file server 11. The block storage apparatus 12 corresponds to the storage device 106.

A network 4 is a network for coupling the file server 11 and the block storage apparatus 12 to each other. The network 4 is, for example, a storage area network (SAN). The file server 11 is coupled to the network 4 via a storage interface 119, and the block storage apparatus 12 is coupled to the network 4 via a storage interface 129. The file server 11 and the block storage apparatus 12 transmit and receive, in order to update and refer to the user data, a command and the user data via the network 4.

The block storage apparatus 12 provides to the file server 11 a storage location of the user data and an access interface (I/F) to blocks of data. The block storage apparatus 12 includes the storage I/F 129 used for communication to and from the file server 11, a processor 122 for executing a program stored in a memory 123, a storage device 124 for storing data, and the memory 123 for storing the program or data, and couples those internal units to one another via a communication path (e.g., bus).

The file server 11 includes a processor 112, a memory 113, a network interface 115, and the storage interface 119, and those units are coupled to one another via a system bus. The processor 112, the memory 113, and the network interface 115 are similar to the corresponding components of the file storage apparatus 10. The memory 113 stores the program group 350 and the management information 250.

As illustrated in FIG. 1, the file storage system 100 includes the content management table 200. The content management table 200 is created for each content. The content management table 200 includes, in addition to conventional management information (not shown), a defrag execution flag 202. The conventional management information is, for example, information forming "inode", and contains information on a length, an owner user, or an update of a content.

When defrag is necessary for the content, the defrag execution flag 202 is set valid. When defrag is unnecessary for the content, the defrag execution flag 202 is set invalid.

When data forming the content is stored in continuous address areas in the medium area 104, the defrag execution flag 202 is set invalid.

In this embodiment, the on-line defrag processing module 301 determines, in the processing of the host update request, whether or not defrag is necessary for a corresponding content based on the update request time defrag determination table 230. When the on-line defrag processing module 301 determines that the defrag is necessary, the on-line defrag processing module 301 sets the defrag execution flag 202 of the content to be valid.

Moreover, based on a determination result of the reference request time defrag determination table 220 or application of off-line defrag, when the on-line defrag processing module 301 determines that the data forming the content has arranged in the physically continuous areas, the on-line defrag processing module 301 sets the defrag execution flag 202 to be invalid.

The off-line defrag management table 210 includes the high-speed execution flag 212. The high-speed execution flag 212 shows a value set from the management computer 15. When the high-speed execution flag 212 is valid, contents to which off-line defrag is to be applied are limited to those having valid defrag execution flags 202, and high-speed defrag is executed.

When the high-speed execution flag 212 is invalid, defrag is applied to all the contents, and optimal data arrangement is achieved for all the contents. A system administrator sets those control operations via the management computer 15.

FIG. 3 shows a configuration example of the reference request time defrag determination table 220. The reference request time defrag determination table 220 includes a column 222 indicating a type of an occupation range of K logically continuous data blocks read from the medium area in the content, a column 223 indicating the number of gaps among K data blocks, and a column 224 indicating a defrag execution determination result.

Thus, the reference request time defrag determination table 220 shows a relationship between a combination of the type of the occupation range of K data blocks in the content with the number of gaps among K data blocks and the defrag execution determination result.

The types of the occupation ranges in the content are a whole content, a part of the content including head data of the content, a part of the content including tail end data of the content, and a part of the content including only intermediate data. The part of the content including only the intermediate data includes data other than the head data and the tail end data.

Performing defrag execution determination based on the relationship between the occupation range in the content and the number of gaps enables more appropriate determination as to defrag effects. In the example shown in FIG. 3, when there may be no defrag effect considering the relationship between the occupation range in the content and the number of gaps, the defrag determination result is invalid. The on-line defrag execution determination result at the time of the reference request may be determined based only on the number of gaps irrespective of the occupation range of the data block in the content.

FIG. 4 shows a configuration example of the update request time defrag determination table 230. The update request time defrag determination table 230 includes a column 232 indicating a type of a host update request, a column 233 indicating continuous block allocation possibility in the medium area 104, and a column 234 indicating a determination result as to a necessity of defrag.

Now, a method for determination as to fragmentation occurrence in a file storage system that includes a file system employing a log-structured file system (LFS) is described. The fragmentation occurrence determination method according to this embodiment is not limited to the LFS. The method can be appropriately modified to be applied to a file storage system including another file system.

The LFS is configured to track updates of both the user data of the content and the management data and record the update data in a log portion of the file system. Update time to be logged is referred to as a check point. The LFS can automatically and continuously generate snapshots of the file system by saving update data of check points of a part or all parts selected from past check points as snapshots.

To update a file, without overwriting data of a block in the medium area 104 corresponding to an update portion of the file with any update data, the LFS writes the update data into another block in the medium area 104. Accordingly, data of an arbitrary check point can be restored. In the memory area 103, data of a block corresponding to the update portion of the file is overwritten with the update data.

Owing to the above-mentioned operation of the LFS, when the host update request is data overwrite processing in an existing content, fragmentation occurs in the content, thus necessitating defrag. When the host update request is an addition request of a new content or a data addition request to the existing content, if all data including existing data and newly added data cannot be stored in the continuous blocks of the medium area 104, fragmentation occurs, thus necessitating defrag. When all the data can be stored in the continuous blocks of the medium area 104, defrag is unnecessary.

Finally, when the host update request is a data deletion request, no defrag occurs. Based on those determination results, it is determined whether or not to validate the defrag execution flag 202 of the content management table 200.

In a file system that overwrites data with update data in the same block, when the host update request is a data deletion request, defrag occurs. When the host update request is data overwrite processing, no defrag occurs. In the case of data addition, processing is similar to that of the LFS.

Figure 5:
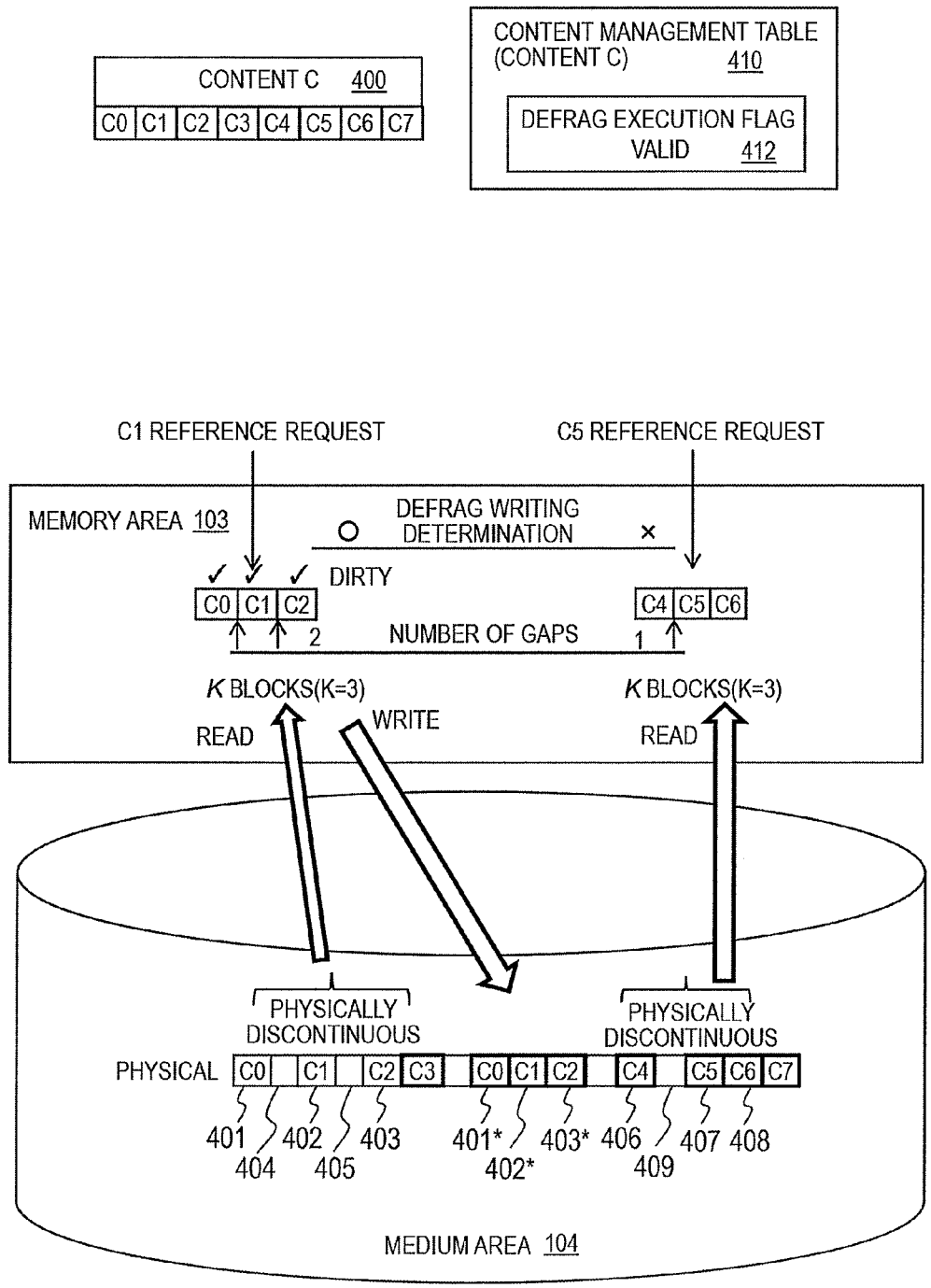
FIG. 5 illustrates an outline of a defrag method at the time of the host reference request.

FIG. 5 illustrates an outline of a defrag method at the time of the host reference request. A content C (400) is formed of data blocks C0, C1, C2, C3, C4, C5, C6, and C7. A defrag execution flag 412 of a content management table 410 of the content C is valid. The data blocks C0, C1, C2, C3, C4, C5, C6, and C7 are stored in the medium area 104. In FIG. 5, a data block illustrated as a thick-line block in the medium area 104 indicates the latest data of the content C.

In the example illustrated in FIG. 5, a reference request of the data block C1 has been issued. For example, when the data block C1 is not cached in the memory area 103, the data block C1 needs to be read from the medium area 104. The cache management table 240 shows whether or not the data block C1 is cached.

The on-line defrag processing module 301 reads, because the defrag execution flag 412 is valid, the logically continuous data blocks C0, C1, and C2 including the reference request data block C1 from the blocks 401 to 403 of the medium area 104. At this stage, as logically continuous peripheral data blocks of the data block C1 in the content, the data block C0 after the data block C1 and the data block C2 before the data block C1 are selected. The on-line defrag processing module 301 reads data from the medium area 104 by using a function provided by an operating system (OS).

Instead, only the data blocks before the data block C1 or only the continuous data blocks after the data block C1 may be selected. The number of data blocks before the data block C1 and the number of data blocks after the data block C1 may be different from each other. In this example, the number K of selected data blocks is 3. However, the number may be another numerical value.

Then, the on-line defrag processing module 301 counts the number of gaps among the data blocks C0, C1, and C2 (blocks 401 to 403) in the medium area 104. The on-line defrag processing module 301 can refer to the address mapping table 260 to know addresses of the data blocks C0, C1, and C2 in the medium area corresponding to the offsets in the content. The on-line defrag processing module 301 counts the number of gaps based on the addresses of the data blocks C0, C1, and C2 in the medium area. The counting of the number of gaps may be executed before the data blocks C0, C1, and C2 are read.

Referring to the example illustrated in FIG. 5, in the medium area 104, a gap 404 is present between the data block C0 (block 401) and the data block C1 (block 402), and a gap 405 is present between the data block C1 (block 402) and the data block C2 (block 403).

Therefore, the number of gaps among the data block C0 (block 401), the data block C1 (block 402), and the data block C2 (block 403) in the medium area 104 is 2.

The on-line defrag processing module 301 refers to the reference request time defrag determination table 220 to determine whether or not to carry out defrag by using the data blocks C0, C1, and C2. The on-line defrag processing module 301 determines whether or not to execute defrag based on occupation ranges of the data blocks C0, C1, and C2 in the content C (400) and the number of gaps thereof.

The data block C0 is head data of the content C (400). Accordingly, the data blocks C0, C1, and C2 include the head data of the content C (400), and are a part of the content C (400). A location of the data block in the content is indicated by an offset thereof.

The reference request time defrag determination table 220 shows that, when the occupation range of the data block in the content is "part of content including head data of content", and the number of gaps thereof is "2", defrag execution determination is "valid". Thus, the on-line defrag processing module 301 determines that defrag is to be carried out by writing the data blocks C0, C1, and C2 into physically continuous areas.

The on-line defrag processing module 301 sets, in the cache management table 240, a cache state of each of the data blocks (stored pages thereof) to be dirty. In place of or in addition to the cache state indicating the dirty state, a special write-only bit indicating defrag processing may be prepared.

Then, a file system program for writing the data blocks C0, C1, and C2 into the medium area 104 obtains, during the writing, writing destination new address areas from the free block management program 310, and writes the data blocks C0, C1, and C2 into the new address areas of the medium area 104.

The new address areas are continuous free blocks, and the file system program for writing into the medium area 104 can obtain information on free blocks from the free block management program 310. In the example illustrated in FIG. 5, the data blocks C0, C1, and C2 are written into continuous blocks 401*, 402*, and 403*.

In place of the file system program for writing into the medium area 104, the on-line defrag processing module 301 may obtain, during the writing, writing destination addresses from the free block management program 310 to set the addresses in the cache management table 240. At this time, the file system program for writing into the medium area 104 writes the data blocks into the writing destination addresses set in the cache management table 240.

The free block management program 310 obtains a processing result of the off-line defrag processing module 302, and manages the blocks 401, 402, and 403 as free blocks and the blocks 401*, 402*, and 403* as non-free areas.

Next, processing for a reference request of a data block C5 is described. As in the case of the data block C1, when the data block C5 is not cached in the memory area 103, the data block C5 needs to be read from the medium area 104.

The on-line defrag processing module 301 reads, in addition to the reference data block C5, continuous peripheral data blocks thereof from the medium area 104. In this example, one data block C4 before the reference data block C5 and one data block C6 after the reference data block C5 are read from the medium area 104.

The data blocks C4, C5, and C6 are stored in blocks 406 to 408 of the medium area 104. In the medium area 104, there is a gap 409 between the data block C4 (block 406) and the data block C5 (block 407).

Accordingly, the number of gaps among the data block C4 (block 406), the data block C5 (block 407), and the data block C6 (block 408) in the medium area 104 is 1. Further, the data blocks C4, C5, and C6 are a part of the content C (400), and include only intermediate data.

The reference request time defrag determination table 220 shows that, when an occupation range of the data block in the content is "part of content including only intermediate data", and the number of gaps thereof is "1", defrag execution determination is "invalid". Thus, the on-line defrag processing module 301 ends the processing without setting a cache state of each of the data blocks C4, C5, and C6 in the cache management table 240 dirty. The data blocks C4, C5, and C6 are not written into the medium area 104.

Counting of the number of gaps may be executed before the data blocks C4, C5, and C6 are read. When defrag is determined to be unnecessary as in the case of this example, there is no need to read any continuous peripheral data of the reference data.

As described above, the on-line defrag processing module 301 executes defrag only when the defrag is valid, and arranges the data forming the content to be continuous in the medium area 104.

Figure 6:
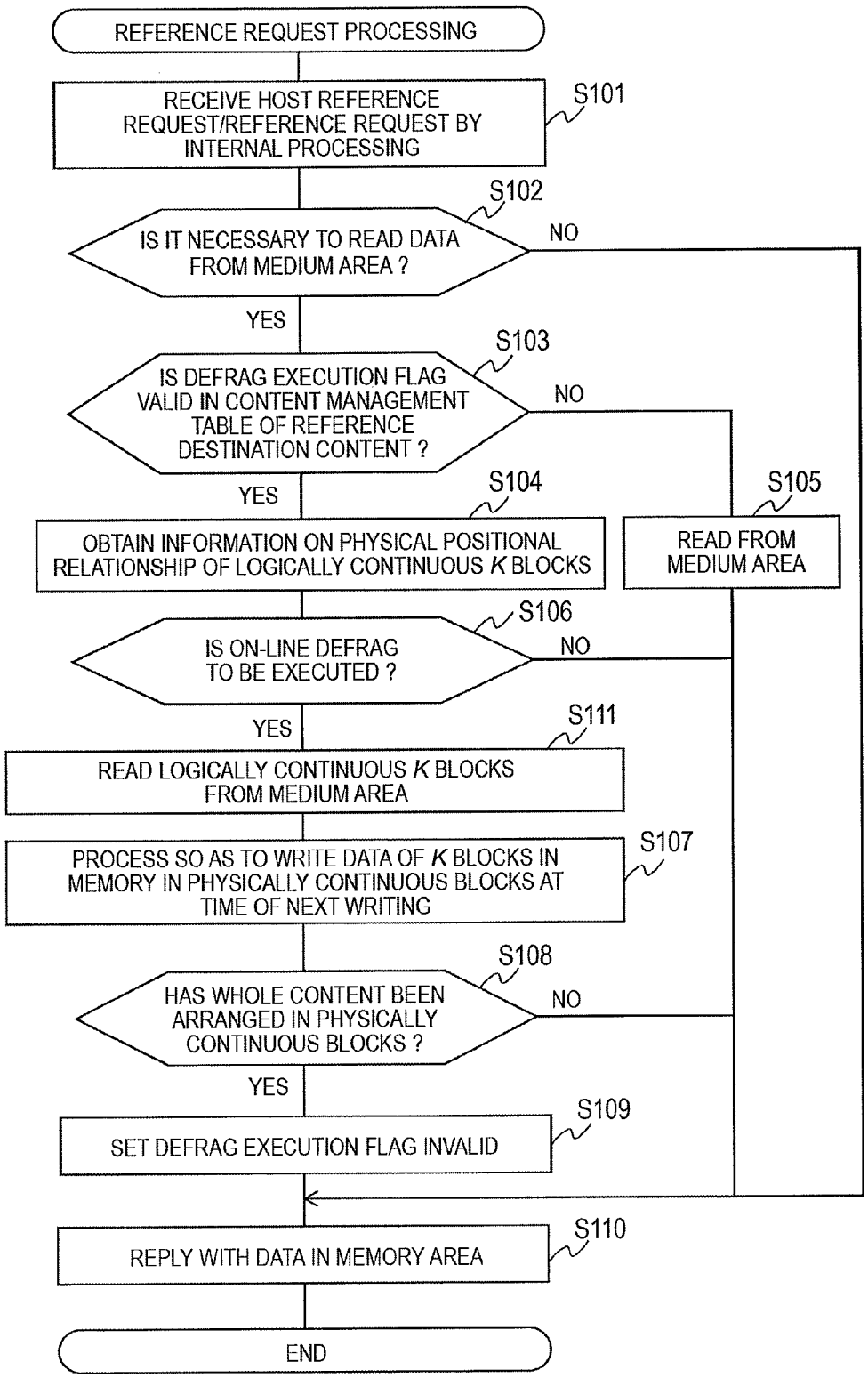
FIG. 6 is a flowchart illustrating a reference request time defrag processing.

FIG. 6 is a flowchart illustrating the reference request time defrag processing. In Step S101, the file system program (not shown) receives a reference request from the host computer 14 or a reference request made by system internal processing. In Step S102, a request processing module refers to the cache management table 240 to determine whether or not it is necessary to read reference data from the medium area 104.

When data has been cached in the memory area 103, and it is not necessary to read the reference data from the medium area 104 (NO in Step S102), in Step S110, the request processing module replies to a request source with the cached data in the memory area 103. Omitting on-line defrag at the time of cache hit enables reduction of loads of the on-line defrag.

When it is necessary to read the reference data from the medium area 104 (YES in Step S102), in Step S103, the on-line defrag processing module 301 refers to the content management table 200 of a reference destination content to determine whether or not the defrag execution flag 202 is valid.

When the defrag execution flag 202 is invalid (NO in Step S103), in Step S105, the on-line defrag processing module 301 reads, by using a medium area I/O module in the OS, reference request data from the medium area 104, and stores the data in the memory area 103. In Step S110, the request processing module replies to the request source with the reference data written into the memory area 103.

When the defrag execution flag 202 is valid (YES in Step S103), in Step S104, the on-line defrag processing module 301 obtains address information (information on physical positional relationship) of read K data blocks in the medium area 104 from the address mapping table 260.

In Step S106, the on-line defrag processing module 301 determines whether or not to execute on-line defrag of K data blocks. The on-line defrag processing module 301 specifies occupation locations of K data blocks in the content, and counts the number of gaps thereof. The on-line defrag processing module 301 specifies, based on offset values of K data blocks in the content and addresses thereof in the medium area 104, the occupation locations of K data blocks in the content and the number of gaps thereof. It should be noted that the on-line defrag processing module 301 may execute the determination of Step S106 after K data blocks are read.

In Step S111, the on-line defrag processing module 301 reads, by using the medium area I/O module, logically continuous K data blocks including a request data block from the medium area 104.

The on-line defrag processing module 301 refers to the reference request time defrag determination table 220 to obtain a value of the defrag execution determination result column 224 to which a set of the occupation locations in the content and the number of gaps corresponds. When the defrag execution determination result is invalid (NO in Step S106), the on-line defrag processing module 301 returns the reference data read from the medium area 104 to the host computer 14, and ends the processing.

When the defrag execution determination result is valid (YES in Step S106), in Step S107, the on-line defrag processing module 301 executes on-line defrag. Specifically, the on-line defrag processing module 301 executes processing so as to write the data of the data of K blocks read into the memory area 103 into physically continuous blocks at the time of next writing.

For example, the on-line defrag processing module 301 sets a cache state of each of K data blocks to be dirty. The medium area I/O module obtains, for those dirty pages, new address areas from the free block management program 310, and writes K data blocks data of the dirty state into designated continuous blocks.

A writing destination of K data blocks may be determined by the on-line defrag processing module 301. In place of or in addition to the dirty cache state, a special write-only bit indicating defrag processing may be prepared. A maximum value m may be defined for the number of data blocks to be written into the continuous blocks. When K is larger than the maximum value m, m continuous data blocks selected from K data blocks are written into the continuous blocks. Writing of the block data is similar in other flowcharts.

The on-line defrag processing module 301 updates the address mapping table 260. Further, in Step S108, the on-line defrag processing module 301 refers, after the defrag, to the address mapping table 260 to determine whether or not the whole content (all data blocks in content) has been arranged in the continuous address blocks (physically continuous blocks) of the medium area 104.

When it is determined that the whole content has been arranged in the physically continuous blocks (YES in Step S108), in Step S109, the on-line defrag processing module 301 sets the defrag execution flag 202 of the content to be invalid. In Step S110, the on-line defrag processing module 301 returns the reference data read into the memory area 103 to the host computer 14, and ends the processing. When it is determined that the whole content has not been arranged in the physically continuous blocks (NO in Step S108), Step S109 is skipped.

Figure 7:
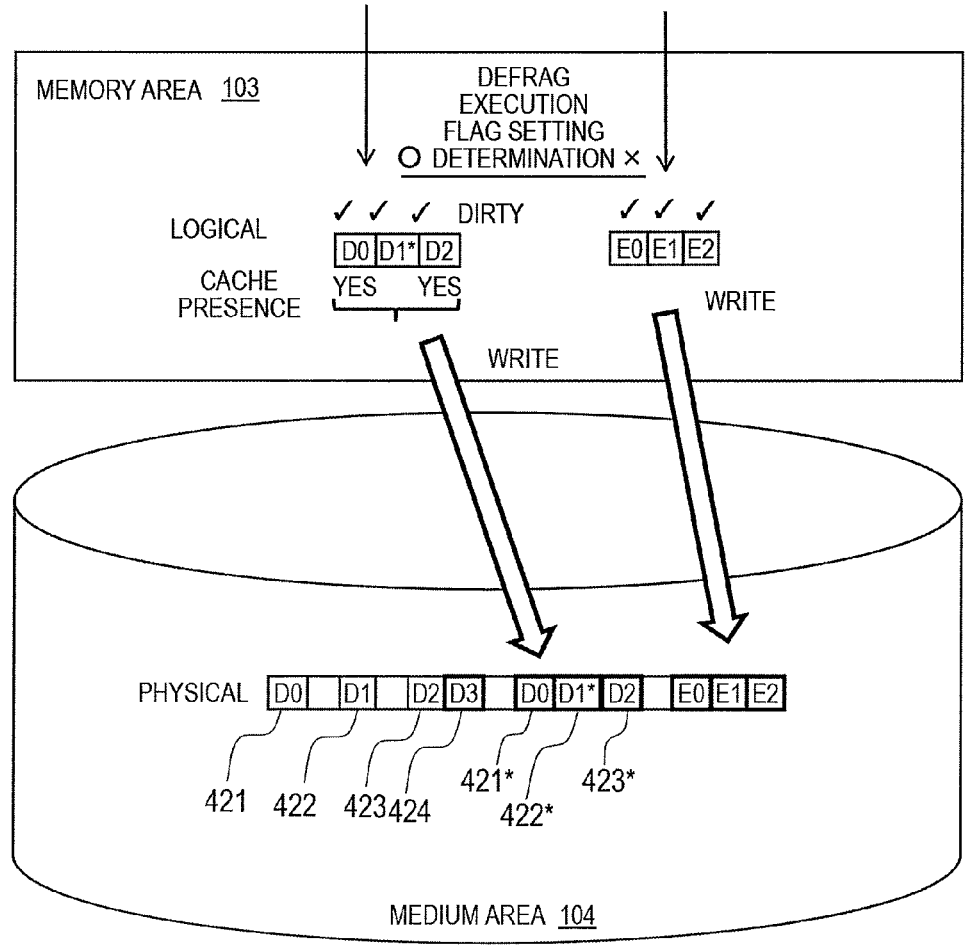
FIG. 7 illustrates an outline of a defrag method at the time of a host update request.

FIG. 7 illustrates an outline of a defrag method at the time of a host update request. Here, an example of a host update request of an overwrite request and an example of a host update request of a new content addition request are described. A target content of the overwrite request is a content D (420). The content D (420) is formed of data blocks D0, D1, D2, and D3, and is stored in the medium area 104.

The host update request requests overwriting of the data block D1 with a data block D1*. The memory area 103 stores the data block D1* received from the host computer 14. The file system program sets a cache state of the data block D1 (stored page thereof) in the cache management table 240 to be dirty.

The on-line defrag processing module 301 refers to the update request time defrag determination table 230 to determine whether or not defrag is necessary. In this case, the host update request is an overwrite request, and the update request time defrag determination table 230 shows that the defrag is necessary. The on-line defrag processing module 301 sets a defrag execution flag 432 of a content D management table 430 to be valid.

When the data blocks D0 and D2 that are logically continuous peripheral data of the data block D1* have already been cached in the memory area 103, the on-line defrag processing module 301 executes processing so as to write the data blocks D0, D1*, and D2 into continuous blocks at the time of next writing thereof.

For example, the on-line defrag processing module 301 sets a cache state of each of the data blocks (stored pages thereof) in the cache management table 240 to be dirty. A medium area write program obtains addresses of free continuous blocks as writing destination addresses from the free block management program 310. The medium area I/O module writes the data into designated continuous blocks.

In place of the medium area I/O module, the on-line defrag processing module 301 may obtain the addresses of the free continuous blocks from the free block management program 310. In place of or in addition to the dirty state assigned to each of the data blocks D0 and D2, a special write-only bit indicating defrag processing may be prepared.

When none of the data blocks D0 and D2 that are logically continuous peripheral data of the data block D1* has been cached, the data block is never read from the medium area 104. Only continuous peripheral data blocks that have already been cached are written together with the data block D1*.

In the example illustrated in FIG. 7, blocks 421, 422, 423, and 424 store the data blocks D0, D1, D2, and D3 before the host update request. After the defrag, blocks 421*, 422*, and 423* and 424 store the data blocks D0, D1*, D2, and D3. The free block management program 310 manages, after the defrag, the blocks 421, 422, and 423 as free blocks.

Next, an outline of an example where the host update request is an addition request is described by using a content E 440. The content E 440 is formed of data blocks E0, E1, and E2. When the content E is newly added, each data block is cached in the memory area 103, and set dirty.

The host update request is a new content addition request, and no logically continuous peripheral data is present in the file storage system 100. The medium area I/O module writes the respective data blocks into physically continuous areas allocated by the free block management program 310.

When the data blocks cannot be written into the continuous areas in the medium area 104, the on-line defrag processing module 301 sets a defrag execution flag of a content E management table 450 to be valid. In the example illustrated in FIG. 7, data blocks E0, E1, and E2 are written into the physically continuous areas, and a defrag execution flag 452 is maintained invalid.

Figure 8:
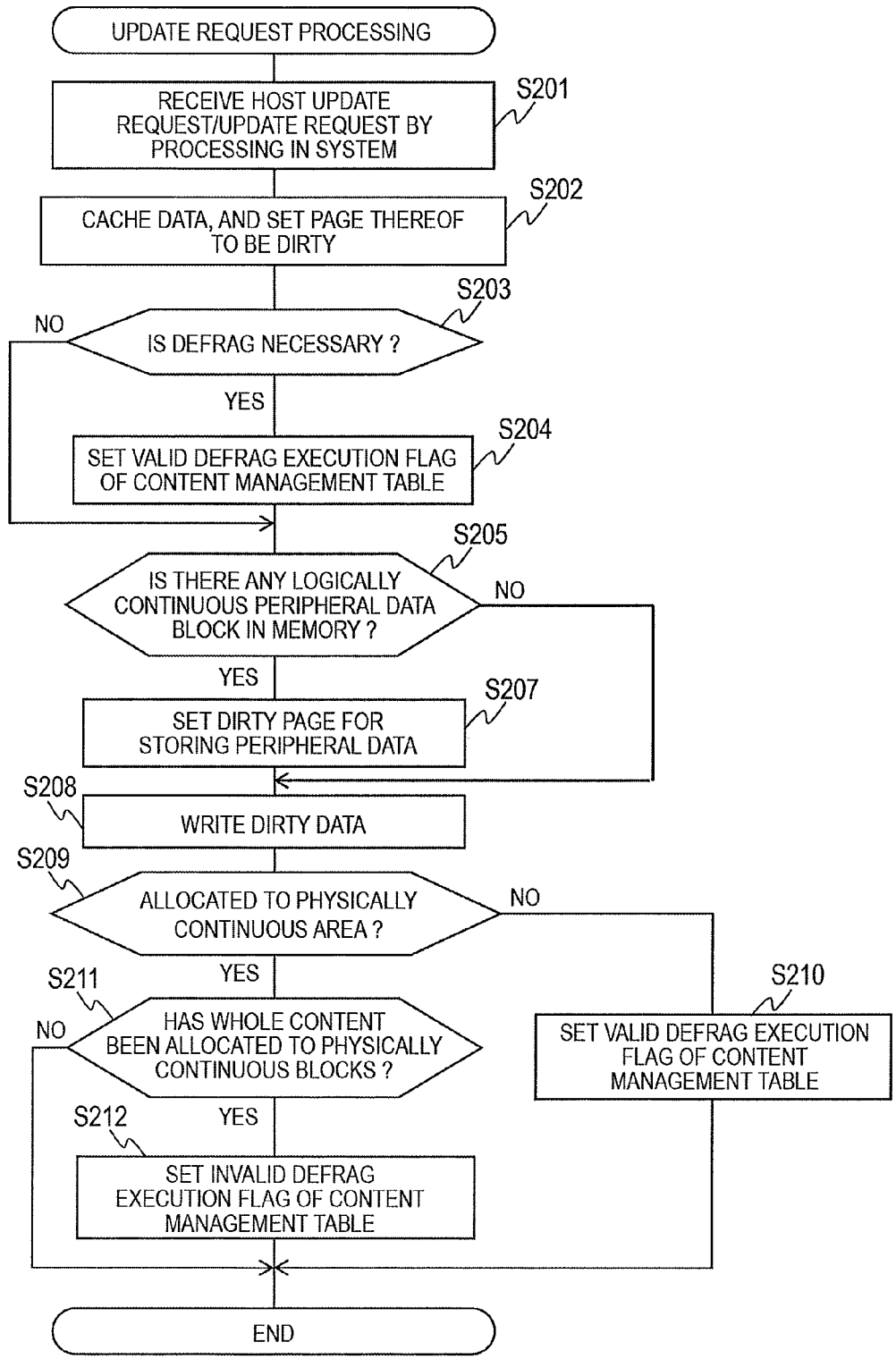
FIG. 8 is a flowchart illustrating a host update request time defrag processing.

FIG. 8 is a flowchart illustrating host update request time defrag processing. In Step S201, the request processing module receives an update request from the host computer 14 or an update request made by system internal processing. In Step S202, the request processing module caches update data in the memory area 103, and sets a cache state of each of data blocks thereof (stored pages thereof) in the cache management table 240 to be dirty.

In Step S203, the on-line defrag processing module 301 refers to the update request time defrag determination table 230 to determine whether or not defrag is necessary based on a type of the host update request. When the on-line defrag processing module 301 determines that the defrag is unnecessary (NO in Step S203), the on-line defrag processing module 301 proceeds to Step S205.

When the on-line defrag processing module 301 determines that the defrag is necessary (YES in Step S203), in Step S204, the on-line defrag processing module 301 sets the defrag execution flag 202 of the content management table 200 of the content to be valid.

In Step S205, the on-line defrag processing module 301 refers to the cache management table 240 to check whether or not existing data blocks (data blocks other than update request data) logically continuous to an update request data block are present in the memory area 103.

When there is no logically continuous peripheral data in the memory area 103 (NO in Step S205), Step S207 is skipped. When there is logically continuous peripheral data in the memory area 103 (YES in Step S205), in Step S207, the on-line defrag processing module 301 sets a cache state of the peripheral data (stored pages thereof) in the cache management table 240 to be dirty.

In Step S208, the medium area I/O module writes the dirty data into free blocks of the medium area 104 allocated by the free block management program 310. As described above, any one of the on-line defrag processing module 301 and the medium area I/O module may obtain address information of writing destination free blocks of the update request data and the peripheral data.

The on-line defrag processing module 301 determines whether or not data including the host update request data and written into the medium area 104 has been allocated to continuous blocks (physically continuous areas) by referring to the mapping table 270.

When the data has not been allocated to the continuous blocks (NO in Step S209), in Step S210, the on-line defrag processing module 301 sets the defrag execution flag 202 of the content management table 200 to be valid, and ends the processing.

When the data has been allocated to the continuous blocks (YES in Step S209), in Step S211, the on-line defrag processing module 301 determines whether or not the whole content has been allocated to the continuous blocks by referring to the mapping table 270.

When the whole content has been allocated to the continuous blocks (YES in Step S211), in Step S212, the on-line defrag processing module 301 sets the defrag execution flag 202 to be invalid, and ends the processing. When the whole content has not been allocated to the continuous blocks (NO in Step S211), Step S212 is skipped.

Figure 9:
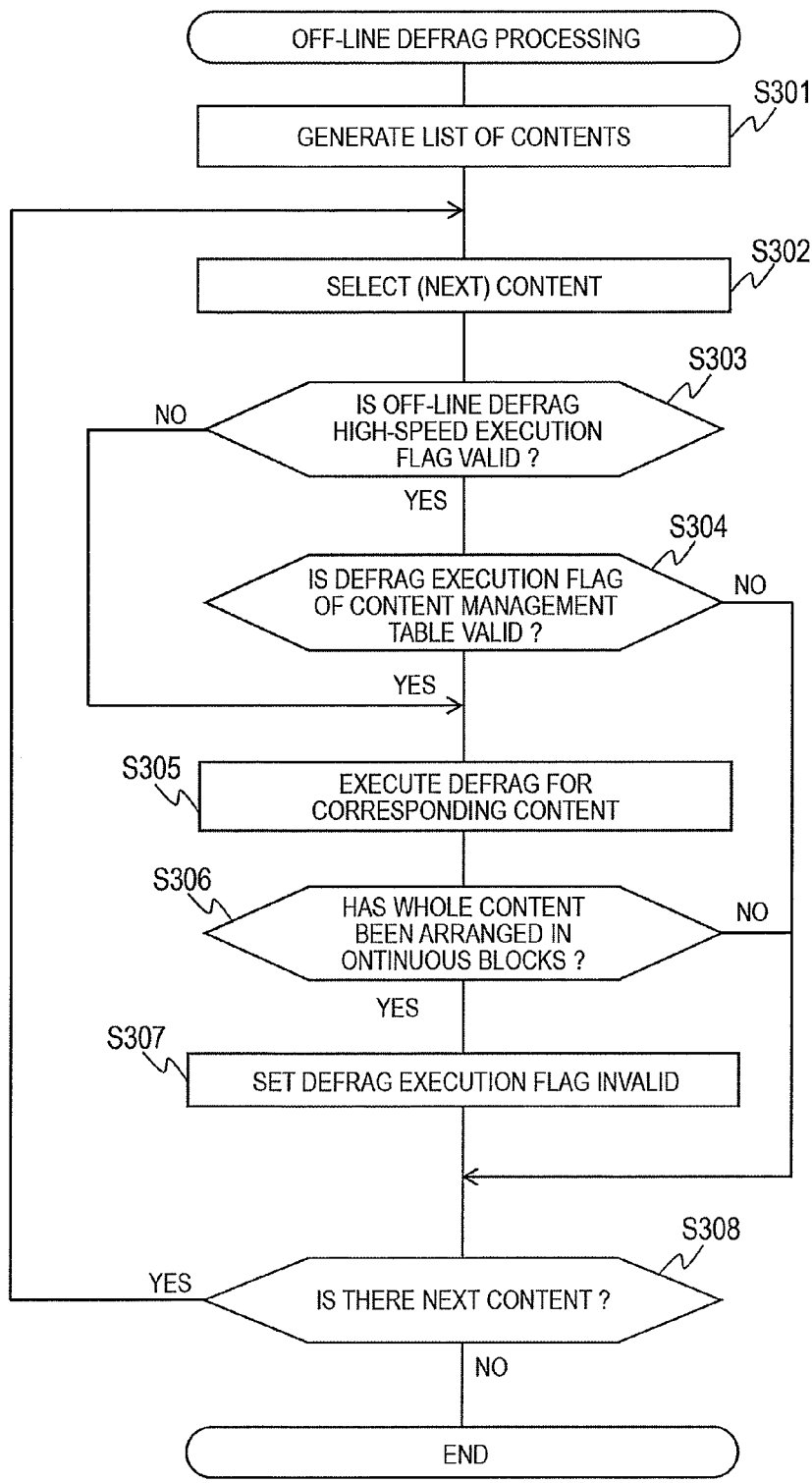
FIG. 9 is a flowchart illustrating off-line defrag processing.

FIG. 9 is a flowchart illustrating off-line defrag processing. In Step S301, the off-line defrag processing module 302 generates a list of contents stored in the medium area 104 from the content management table 200. In Step S302, the off-line defrag processing module 302 selects one of the contents. In Step S303, the off-line defrag processing module 302 determines whether or not the high-speed execution flag 212 of the off-line defrag management table 210 is set valid. The high-speed execution flag 212 is set from the management computer 15 by the administrator.

When the high-speed execution flag 212 is valid (YES in Step S303), in Step S304, the off-line defrag processing module 302 determines whether or not the defrag execution flag 202 of the content management table 200 is valid. When the high-speed execution flag 212 is invalid (NO in Step S303), Step S304 is skipped.

When the defrag execution flag 202 is invalid (NO in Step S304), the off-line defrag processing module 302 proceeds to Step S308. When the defrag execution flag 202 is valid (YES in Step S304), in Step S305, the off-line defrag processing module 302 executes defrag of a corresponding content.

In Step S306, the off-line defrag processing module 302 refers, after the defrag, to the mapping table 270 to determine whether or not the whole content has been arranged in the continuous blocks. When the whole content has been arranged in the continuous blocks (YES in Step S306), in Step S307, the off-line defrag processing module 302 sets the defrag execution flag 202 of the corresponding content to be invalid. When the whole content has not been arranged in the continuous blocks (NO in Step S306), Step S307 is skipped.

In Step S308, the off-line defrag processing module 302 determines whether or not there is any next content. When there is a next content (YES in Step S308), the off-line defrag processing module 302 returns to Step S302. When there is no next content (NO in Step S308), the off-line defrag processing module 302 ends the off-line defrag.

It should be noted that the storage system 100 may not execute at least one of the on-line defrag and the update request time on-line defrag. The storage system 100 may execute, without referring to the defrag execution flag, the off-line defrag of the whole content. The storage system 100 may also execute on-line defrag at the time of cache hit in the reference request. The defrag execution flag may not be used.

Second Embodiment

Figure 10:
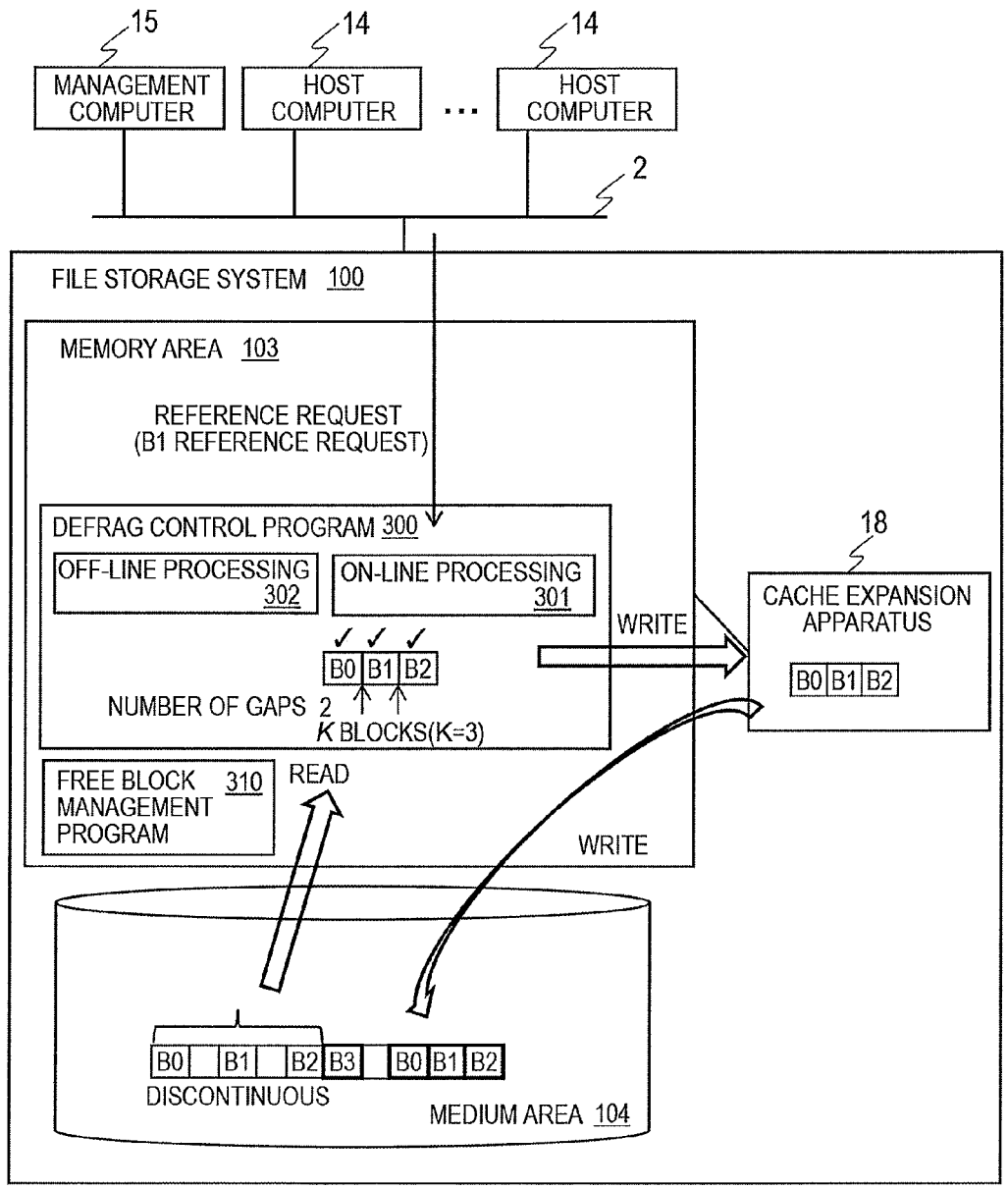
FIG. 10 illustrates an outline of a second embodiment.

A second embodiment is directed to a defrag method implemented in cooperation with a cache expansion apparatus. As illustrated in FIG. 10, a cache expansion apparatus 18 is coupled to the file storage apparatus 10 and the file server 11, and the memory area 103 can accordingly be expanded. A cache expansion area provided by the cache expansion apparatus 18 may be formed of a storage medium such as a nonvolatile memory (NVM) represented by a flash memory. The cache expansion area may be used as a swap area for temporarily storing data of the memory area, or directly as a memory area.

When the cache expansion area is treated as in the case of a normal memory area, there is no change from the first embodiment, and thus description thereof is omitted. In the following, a case where the cache expansion area is used as a secondary cache area or a swap area is described.

In FIG. 10, a content B is formed of data blocks B0, B1, B2, and B3. The data blocks B0, B1, B2, and B3 are stored in discontinuous blocks of the medium area 104. A host reference request requests reference to the data block B1.

The on-line defrag processing module 301 reads the data blocks B0 and B2 together with the data block B1. The memory area 103 is limited in capacity, and thus all data cannot be stored in the memory. At this time, a page recovery processing module of the OS operates when the remaining memory capacity is short. For example, when one of the logically continuous data blocks B0, B1, and B2 is a recovery target, while maintaining continuity, the data blocks are arranged to be continuous in the cache expansion apparatus 18. Accordingly, reading performance of the data blocks B0, B1, and B2 from the cache expansion apparatus is improved.

During defrag execution, the defrag control program 300 writes, without reading the data stored in the cache expansion area from the medium area 104, the data into continuous addresses in the medium area 104. Thus, an I/O read from the medium area 104 is unnecessary, and thus defrag performance is improved.

The data stored in the cache expansion area is treated as in the case of the data stored in the memory area 103. Only a data storage location is written into memory management information managed by the OS. Accordingly, there is no change from the on-line defrag processing and the off-line defrag processing described above in the first embodiment.

Figure 11:
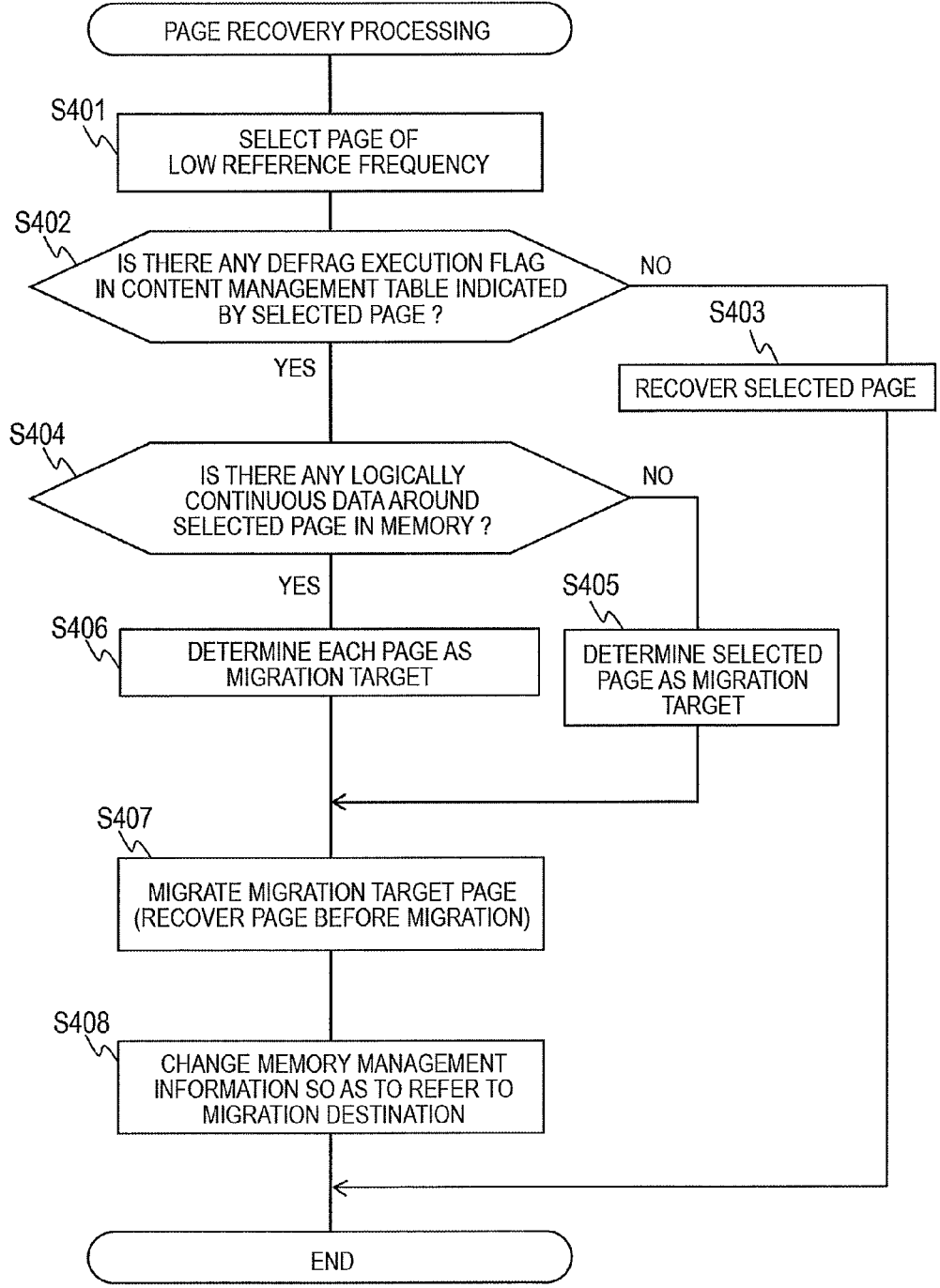
FIG. 11 illustrates is a flowchart illustrating a page recovery processing.

Now, page recovery processing is described. A page is a data storage unit in the memory area 103. FIG. 11 illustrates the page recovery processing in the memory area 103 according to this embodiment. In Step S401, the page recovery processing module refers to memory management information for managing a page reference frequency to select a page of a low reference frequency. In Step S402, the page recovery processing module determines, in the content management table 200 indicated by the selected page, whether or not the defrag execution flag 202 is valid.

When the defrag execution flag 202 is invalid (NO in Step S402), in Step S403, the page recovery processing module executes recovery processing for the selected page. When the defrag execution flag 202 is valid (YES in Step S402), in Step S404, the page recovery processing module determines whether or not there is any logically continuous data around the selected page in the memory.

When there is no logically continuous data (NO in Step S404), in Step S405, the page recovery processing module determines the selected page as a migration target to a secondary cache area or a swap area. When there is logically continuous data (YES in Step S404), in Step S406, the page recovery processing module determines pages of the continuous data including the selected page as migration targets.

In Step S407, the page recovery processing module migrates data of the migration target page to recover a page before the migration. In Step S408, the page recovery processing module changes the memory management information so as to refer to a migration destination of the page as a reference destination of data whose memory management information has been migrated, and ends the processing. Through this processing, access performance of the migrated page data can be improved.

Third Embodiment

In order to achieve a high speed of defrag processing, data needs to be written into physically continuous areas at a high speed. In particular, when a flash memory is used, overwrite performance in an area where data has been written once is low.

When a storage pool is created, and a physical area of a storage device is allocated only for actually used data, an area to which data is migrated by defrag is a free area in the free block management program 310. However, when no releasing processing has been carried out in the storage pool, the area is a used area in the storage pool. In other words, through application of the defrag, used areas in the storage pool increase, thus reducing use efficiency of physical storage areas. In a third embodiment, those problems are solved.

In the following, an example of a file storage system that includes a file system employing LFS is described. A method described below is not limited to the LFS. In a file storage system that includes a file system not employing LFS, the method can be used so as to release blocks yet to be used (trimming).

The LFS automatically and continuously generates snapshots of the file system. When updating a content, the LFS writes, without overwriting data of a block into the medium area 104 corresponding to an update portion of the content, the update data in another block in the medium area 104. This enables restoration of data at an arbitrary past point of time. In the memory area 103, data of a block corresponding to the update portion of the content is overwritten. This arbitrary point of time is referred to as a check point.

Figure 12:
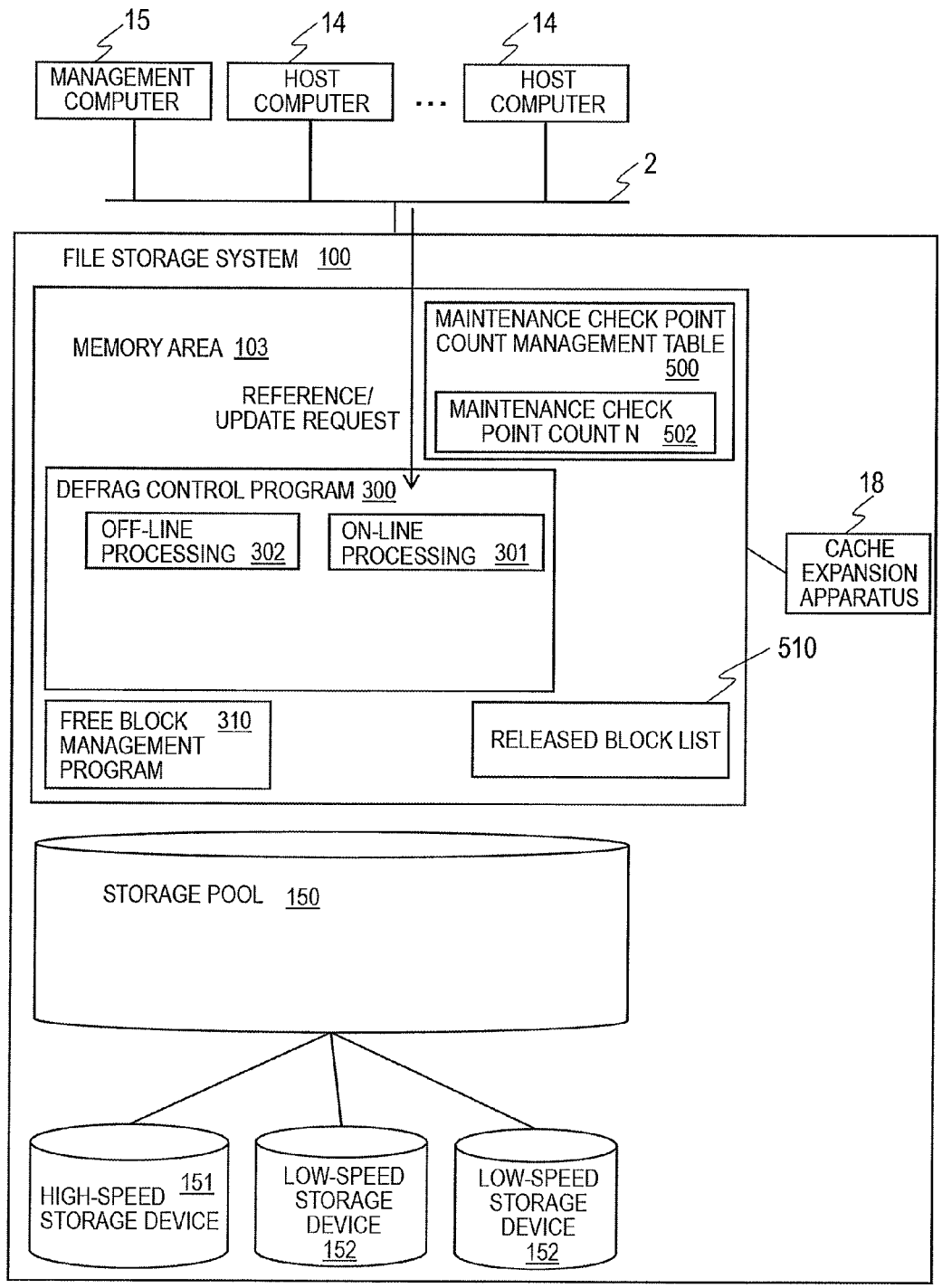
FIG. 12 illustrates an outline of the third embodiment.

FIG. 12 illustrates an outline of the third embodiment. A maintenance check point count management table 500 and a released block list 510 are added to the configuration of the first embodiment. The administrator can set, in the maintenance check point count management table 500, a maintenance check point count 502 from the management computer 15.

In the maintenance check point count management table 500, the maintenance check point count 502 indicates how many past check points from a currently processed latest check point are to be maintained. The maintenance check point count 502 includes no snapshot. Data of some check points are stored as snapshots. A check point selected as a snapshot can be designated from the management computer 15.

Data is maintained from the latest check point to a maintenance check point count excluding snapshots. A block for storing data of an older check point is released as described below.

The released block list 510 indicates block addresses of the medium area 104 set releasable at certain check points due to defrag or an increase of check points. When a certain checkpoint is created, a released block recovery processing module may store the released block list 510 associated with the certain check point in the medium area 104. In this configuration, the released block list 510 is created for each check point.

The released block recovery processing module reads the released block list 510 for each check point, and carries out releasing processing including trimming up to the check point of (latest check point—maintenance check point count N).

In FIG. 12, s storage pool 150 is created. A storage area of the storage pool 150 is formed of a storage area of a high-speed storage device 151 such as at least one NVM and a storage area of a low-speed storage device 152 such as at least one hard disk drive (HDD).

The released block recovery processing module operates synchronously or asynchronously with host request processing. The released block recovery processing module carries out, based on a released block list registered up to the maintenance check point count 502 of the maintenance check point count management table 500, block releasing processing (trimming) in the cache expansion apparatus 18 or the storage pool 150. Thus, in the cache expansion apparatus 18 or the storage pool 150, area releasing processing can be carried out.

Figure 13:
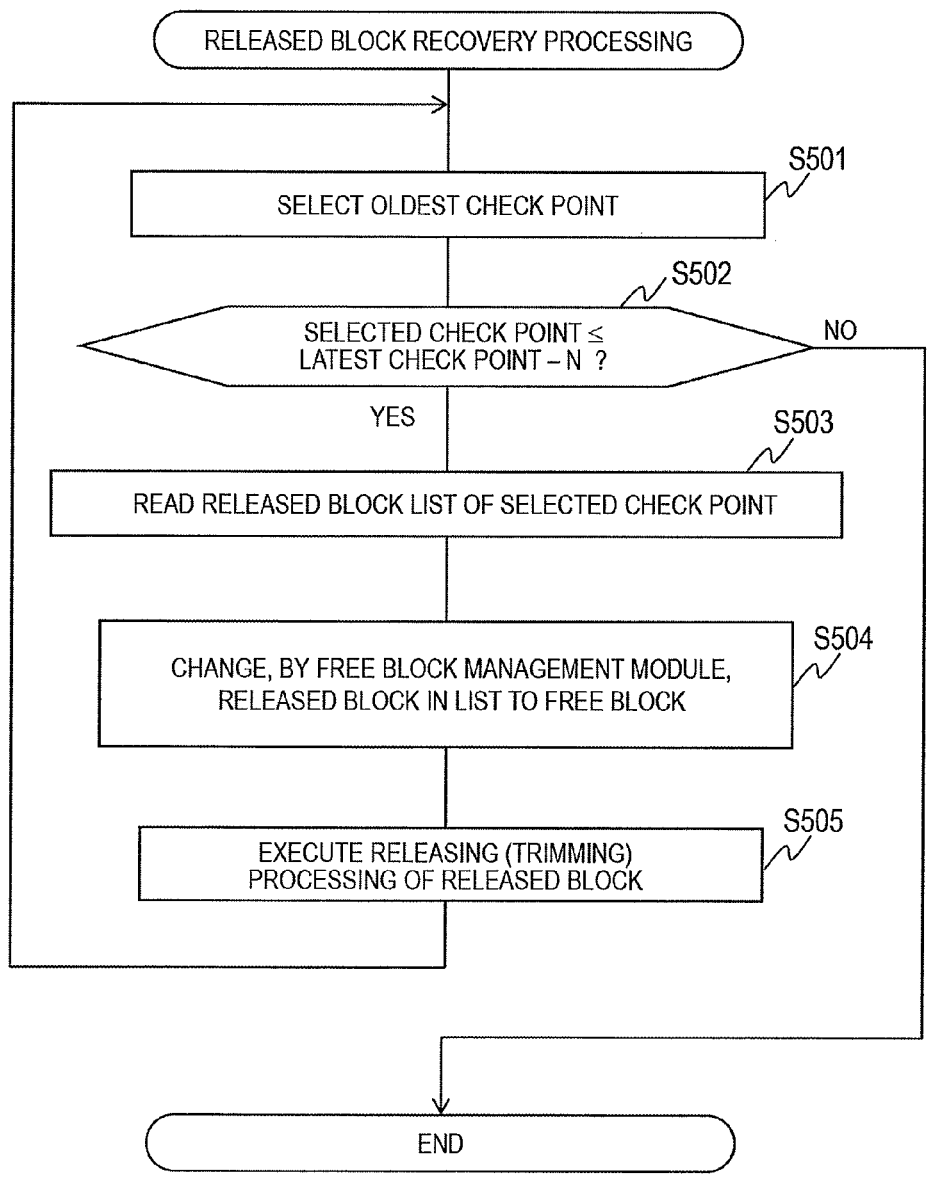
FIG. 13 is a flowchart illustrating the released block recovery processing module.

FIG. 13 is a flowchart illustrating the released block recovery processing module. The file storage system 100 stores check point management information (not shown) for associating a check point with a block address. In Step S501, the released block recovery processing module searches the check point management information to select an oldest check point. In Step S502, the released block recovery processing module determines whether or not the selected check point is before (latest check point—maintenance check point count N). As described above, snapshots are excluded from counting.

When a determination result of Step S502 is negative (NO in Step S502), the released block recovery processing module ends the processing. When the determination result of Step S502 is positive (YES in Step S502), the released block recovery processing module reads the released block list 510 of the selected check point (S503).

The free block management program 310 changes the released block address of the released block list 510 to a free block (S504). The released block recovery processing module executes release processing (trimming) of the released blocks (S505), and returns to Step S501. Through this processing, efficient use of the storage area can be achieved by releasing unused blocks.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A storage system, comprising:
a medium area provided by at least one storage device to store data of a content; and
a controller comprising a memory area for temporarily storing data of the medium area,
wherein the controller is configured to:

obtain, from a source, a reference request of a reference request data block that is included in the content and is stored in the medium area;

read, from the medium area, k data blocks, wherein k is a number larger than the requested reference request data block and is a value predetermined before the reference request;

determine an occupation range in content and a number of gaps among addresses, in the medium area, of a plurality of data blocks continuous in the content including the reference request data block;

determine, based on the occupation range in content and the number of gaps, whether or not defrag based on the plurality of data blocks is valid;

write, when the defrag is determined to be valid, the plurality of data blocks read from the medium area to the memory area, into continuous address areas of the medium area; and send the reference request data block to the source, wherein the number of gaps needed for defragment in case of the occupation range in content includes head data or tail end data of the content is fewer than the number of gaps needed for defragment in case of the occupation range in content does not include head data or tail end data of the content.

2. The storage system according to claim 1, wherein the controller is configured to:

read, when the reference request data block is not cached in the memory area, the plurality of data blocks including the reference request data block from the medium area into the memory area;

determine, based on the number of gaps of the plurality of read data blocks, whether or not the defrag based on the plurality of data blocks is valid; and return, when the reference request data block is cached in the memory area, the cached reference request data block without reading the plurality of data blocks from the medium area.

3. The storage system according to claim 1, wherein the controller is configured to write, in processing of an update request of the content accompanied by an update request data block, when a plurality of data blocks continuous in the content and including the update request data block are cached in the memory area, the plurality of data blocks including the update request data block into the continuous address areas of the medium area.

4. The storage system according to claim 1, wherein the controller is configured to determine, based on an occupation range of the plurality of data blocks in the content, whether or not the defrag based on the plurality of data blocks is valid.

5. The storage system according to claim 1, wherein the controller includes defrag execution control information for controlling execution of the defrag of the content, and wherein the controller is configured to:

set, when all data in the content has been stored in the continuous address areas of the medium area, the defrag execution control information to invalid defrag; and determine, when the defrag execution control information indicates valid defrag, based on the number of gaps, whether or not the defrag based on the plurality of data blocks is valid.

6. The storage system according to claim 5, wherein the controller is configured to determine, based on a type of an update request of the content, whether or not to set the defrag execution control information to invalid defrag.

7. The storage system according to claim 5, wherein the controller is configured to execute off-line defrag of the content when the defrag execution control information indicates valid defrag, and avoid executing the off-line defrag when the defrag execution control information indicates invalid defrag.

8. The storage system according to claim 1, wherein the controller includes a memory expansion area coupled to the memory area to expand the memory area, and the controller is configured to migrate the data blocks that are stored in the memory area and are continuous in the content to continuous address areas of the memory expansion area.

9. The storage system according to claim 1, wherein the controller is configured to:

store released block management information for managing a block that stores past data in the medium area and is to be released; and execute, in the medium area, release processing of the block registered in the released block management information.

10. A method of controlling a storage system, the storage system comprising:

a medium area provided by at least one storage device to store data of a content; and a memory area for temporarily storing data of the medium area, the method comprising:

obtaining, from a source, a reference request of a reference request data block that is included in the content and is stored in the medium area;

reading, from the medium area, k data blocks, wherein k is a number larger than the requested reference request data block and is a value predetermined before the reference request;

determining an occupation range in content and a number of gaps among addresses, in the medium area, of a plurality of data blocks continuous in the content including the reference request data block;

determining, based on the occupation range in content and the number of gaps, whether or not defrag based on the plurality of data blocks is valid;

writing, when the defrag is determined to be valid, the plurality of data blocks stored in the medium area into continuous address areas of the medium area; and sending the reference request data block to the source, wherein the number of gaps needed for defragment in case of the occupation range in content includes head data or tail end data of the content is fewer than the number of gaps needed for defragment in case of the occupation range in content does not include head data or tail end data of the content.

11. The method of claim 10, wherein k is independent and unrelated to the number of requested reference request data blocks.

* * * * *